United States Patent [19]

Born et al.

[11] 4,231,914

[45] Nov. 4, 1980

[54] POLYURETHANE-BASED BINDER SYSTEM FOR THE PRODUCTION OF CASTING MOLDS OR CORES

[76] Inventors: Thorwald Born, Leipziger Str. 89, 3000 Hannover 1; Karl-Heinz Brüning, August-Bebel-Str. 10, 3012 Langenhagen 1, both of Fed. Rep. of Germany

[21] Appl. No.: 910,283

[22] Filed: May 30, 1978

[30] Foreign Application Priority Data

Dec. 31, 1977 [DE] Fed. Rep. of Germany ....... 2759262

[51] Int. Cl.$^3$ .............................................. C08K 5/10
[52] U.S. Cl. ......................... 260/31.8 N; 260/31.8 T; 260/31.8 B
[58] Field of Search .................... 260/31.8 T, 31.8 N, 260/31.8 B, DIG. 40

[56] References Cited

U.S. PATENT DOCUMENTS

| | | | |
|---|---|---|---|
| 3,143,517 | 8/1964 | Heiss | 260/31.8 N |
| 3,440,224 | 4/1969 | Impola et al. | 260/31.8 N |
| 3,676,392 | 7/1972 | Robins | 260/DIG. 40 |
| 3,726,827 | 4/1973 | Jones et al. | 260/31.8 N |
| 3,905,934 | 9/1975 | Gardikes | 260/31.8 T |
| 4,076,660 | 2/1978 | Olstowski et al. | 260/31.8 N |

*Primary Examiner*—Lewis T. Jacobs
*Attorney, Agent, or Firm*—Warren, Chickering & Grunewald

[57] ABSTRACT

Producing casting molds by blending flowable, granular material such as sand with a binder system including reactants to form polyurethane, i.e., polyisocyanates and polyols, and a solvent consisting of an ester having as its acid component an aliphatic dicarboxylic acid with from six to twelve carbon atoms, or a benzene polycarboxylic acid with at least three COOH groups; and having as its alcohol component an aliphatic, cycloaliphatic, arylaliphatic, or aromatic alcohol having from six to thirteen carbon atoms.

3 Claims, No Drawings

POLYURETHANE-BASED BINDER SYSTEM FOR THE PRODUCTION OF CASTING MOLDS OR CORES

BACKGROUND OF THE INVENTION

In casting technology, casting molds and cores of any considerable size are made from material mixtures containing a grainy base (in most cases sand) mixed with a polyurethane-based, cold hardening binder system. Such a binder system is composed of polyisocyanates with at least two NCO groups in the molecule and polyols with at least two OH groups in the molecule as reaction partners, as well as a tertiary amine or in some cases a chelate compound as an accelerator. Depending on whether the so-called "cold hardening process" or the so-called "gas hardening process" is being used, the accelerator will be added to the mixture either (a) together with the other ingredients of the binder system immediately before the mixture is to be used, or (b) only after the mixture, made up without the accelerator, has been put into a casting box and the mixture in the box is then treated with a gaseous tertiary amine accelerator.

A binder system of this sort generally also includes a solvent, especially when one or both reaction partners are present in a higher molecular form such as prepolymers. Thus, for example, resins of condensation made of phenols or phenol-related compounds with aldehydes are quite well-suited polyols, which regularly require a solvent on account of their relatively high molecular weight.

Although the solvent does not participate in the reaction between the polyisocyanates and the polyols to form urethanes, it nevertheless exerts an influence on the course of the reaction, which is probably related to the fact, among others, that the two reaction partners have varying degrees of compatibility with the various types of solvents. In general, polar solvents are well suited for phenol resins and similar polyols but less compatible with polyisocyanates while the opposite is true of non-polar solvents. In practice, therefore, mixtures of polar and non-polar solvents are normally used, the proportions being adjusted to suit the particular binder system used. The individual ingredients of this mixture should not have too low a boiling point so that the solvent does not lose its effectiveness too soon through evaporation.

For non-polar solvents, aromatic hydrocarbons which are usually in the form of mixtures with a boiling point above ca. 150° C. (at normal pressure) are preferred; and for polar solvents, aliphatic and cyclic ketones, fatty acid esters, acetals or ketals, glycol esters, glycol ether esters, glycol diethers and similar types of compounds having a sufficiently high boiling point have been used.

However, all of the above-named polar solvents have a serious disadvantage, in contrast to the non-polar solvents mentioned: they have an extremely unpleasant smell and thus make for unpleasant working conditions, which cannot generally be remedied by special hoods or the like. In this connection it should be pointed out that resins have been developed that have only a slight unpleasant odor (which might, for example, be due to a residue of free formaldehyde), so that the solvents are in fact the principal source of unpleasant smells on the job. Solvents with no odor and with otherwise satisfactory characteristics are, therefore, urgently necessary.

A first step in this direction has been disclosed in Austrian Pat. No. 342,794 in suggesting the use of phthalic acid dialkylesters (preferably o-phthalic acid), which are liquid at room temperature and have an alkyl radical of from one to twelve and typically from three to six carbon atoms. Such phthalic acid esters are quite odorless, if not completely so. They have the additional advantage that they are more compatible with polyisocyanates than, for example, isophoron (a cyclic ketone frequently used as a solvent) and therefore lead to casting forms with somewhat better characteristics. Of course, their compatibility with polyisocyanates is still not optimal, and they have the additional disadvantage that they crack easily during the casting process, which leads to sublimation with a lot of smoke and correspondingly strong smell.

SUMMARY OF THE INVENTION

The invention has the purpose of creating an odorless polar solvent for a polyurethane-based binder system for material mixtures used in the production of casting molds and cores, which will avoid the disadvantage of the phthalic acid dialkyl esters with regard to thermal stability during casting and will also improve the characteristics not only of the material mixture but also of the casting forms made from it.

The invention achieves this by means of a solvent consisting of or containing esters having as their acid component either an aliphatic dicarboxylic acid with from six to twelve carbon atoms or a benzene polycarboxylic acid with three or more COOH groups, and having as their alcohol component an aliphatic, cyclo aliphatic, arylaliphatic or aromatic alcohol with from six to thirteen carbon atoms.

Typical examples of the acid components of the group of esters lying in this range are the radicals of the aliphatic dicarboxylic acids adipinic acid (6 carbon atoms), suberinic acid (8 carbon atoms), azelaic acid (9 carbon atoms), sebacinic acid (10 carbon atoms) and decandicarboxylic acid (12 carbon atoms), as well as the radicals of the benzene polycarboxylic acids trimellitic acid (3 COOH groups attached to the benzene nucleus) and pyromellitic acid (4 COOH groups attached to the benzene nucleus). For the alcohol components, typical examples are all the aliphatic alcohols with six to thirteen carbon atoms, i.e., from hexylalcohol to tridecylalcohol, as well as cyclic, arylaliphatic and aromatic alcohols like cyclohexyl alcohol, cyclooctyl alcohol and benzyl alcohol, and in some cases alcohols with additional ether bridges, like butoxyethyl alcohol. This includes all isomers and mixtures of isomers, which typically occur commercially, for the acid components as well as the alcohol components. In addition, the solvents specified in the invention need not consist of only one of the esters lying in the range of the invention, but may also be mixtures of different esters in this range.

Correspondingly, the solvents defined by the invention can be chosen from one or several of the following particular esters, which have been shown to be very appropriate: bis-(2-ethylhexyl)-adipate (DOA), di-n-nonyl-adipate and di-isononyl-adipate, di-n-octyl-adipate (DIDA), bis-[methylcyclohexyl]-adipate, bis-[methyl-cyclohexylmethyl]-adipate, benzyl-octyl-adipate, bis[butoxyethyl]-adipate, di-n-hexyl-azelate (DHAZ), tetrakis-[2-ethylhexyl]-pyromellitate, trisi-sooctyl-trimellitate, tris-octyl-trimellitate, bis-2-ethylhexylsebacate, di-n-octyl-sebacate, di-n-hexyl-sebacate, as well as esters from alcohol mixtures like tri-n$C_8$-$C_{10}$-

Tri-mellitate (TTM) and di-nC$_7$-nC$_9$-adipate. Their boiling points are without exception above this value. So they all belong to the class of materials having a high boiling point.

The solvents specified in the invention are odorless and nontoxic, so they fulfill the demands for environmental protection on the job. Also, their thermal stability is very high, and their rate of evaporation is practically nil. But above all, they improve the characteristics of the mold material and the molds made from it to a considerable degree, which is especially striking in the case of the gas hardening process.

Before the advantages of the solvents specified by the invention are explained in detail, it should be pointed out that these advantages were not at all predictable, even though the esters used for solvents up to now were analogous in structure. Of course, the aliphatic esters which are familiar as solvents have either or both components with less than six carbon atoms, and the familiar phthalic acid esters have only two ester groups attached to the benzene nucleus. In contrast, the solvents specified by the invention, insofar as they are esters of an aliphatic dicarboxylic acid, have a relatively high number of carbon atoms, as well as a comparable number of carbon atoms in the two components; and the benzene polycarboxylic acids have three or more ester groups attached to the benzene nucleus. This difference has proved to be decisive for the success of the invention. The esters used according to the invention have-despite the consistently higher number of ester groups in the molecule—a strongly hydrophobic, non-polar molecular structure, in which the polar effect of the ester groups is largely screened off by the hydrophobic radicals lying on the outside. What is surprising is that they play something of a double role in that they function like a good polar solvent with good dissolving power with respect to the resin but behave otherwise like a non-polar solvent. That is, they are hydrophobic and exceptionally compatible with polyisocyanates.

Other esters having components with long chains which are not in the range of the invention, like butyl stearate for example, do not have the positive effects of the solvents specified by the invention. Thus the range of solvents specified by the invention is limited below by the fact that success does not occur if one of the two components has fewer than six carbon atoms. The upper limit is established by the fact that esters with more than twelve or thirteen carbon atoms are as hard as wax.

The high thermal stability of the solvents specified by the invention in connection with their high boiling points delays the moment of disintegration in casting and thus increases the thermal load the molds are capable of bearing. Thus not only are problems arising from undesirable cracking avoided, but there is also an improvement of the casting surface, especially in the case of cast iron. Besides that, the solvents specified by the invention do not evaporate so that even in storage of cores or other molds which are being hardened by the gas hardening process, the solvents remain available to take on energy when used in casting.

Further, the general stability of molds produced by the use of the solvents specified by the invention is quite excellent and in any case better than that attainable with previously used solvents. In this connection, two other factors should be especially pointed out, however, which play an important role in the gas hardening process, namely, the sand-life and the permanence of the hardened cores. Sand-life is the length of time in which a material mixture which has been prepared but not yet treated with the accelerator can be stored and remains useful. Use of the solvents specified in the invention gives sand-lives of five hours or more, after which time the forms are not as strong as they were initially but still quite adequate for casting. Such long sand-lives have not been possible with previously known solvents. The hardened molds are also capable of extended storage. While with the use of previously known solvents the stability falls off after reaching a maximum, especially when the humidity is high, molds made with a solvent specified by the invention do not show this phenomenon.

This superiority of the solvents of the invention over the previously known solvents, with regard to strength and storage capacity of the hardened molds and to sand-life, is a consequence of the strongly hydrophobic nature of the solvents specified by the invention. The solvents previously known (including those involving phthalic acid esters) are not hydrophobic enough and it is generally necessary to make the mixture more water-repellant by treating it with special silanes. The solvents specified by the invention do not require such treatment. Even without the addition of silanes, they yield results which are previously unattainable except through use of silanes. When in the use of solvents specified by the invention, silane treatment is applied as well, the results are even better.

It has been further shown that the use of solvents specified by the invention drastically reduces or eliminates entirely the tendency for material to stick in the production of cores. This makes for efficient production with minimal waste of material and no need for time-consuming repair operations. This, too, is a clear advantage in comparison to previously known solvents, including phthalic acid esters.

Another surprising advantage of this invention is that when it is used with mixtures for the gas hardening process, a considerably smaller amount of gaseous tertiary amine is required. This reduced consumption of amine can be as much as 50% depending on the particular resin and solvent used.

The solvents specified by the invention can be used alone but it is preferable to use them mixed with non-polar solvents of the usual types, particularly with aromatics having a high boiling point. The portion of such a solvent mixture which consists of solvents as specified by the invention can be anything in excess of 10% by weight and it is preferably between 10% and 60% and is chosen to suit the particular resin in question. The prepared resin solution can, in any case, have a solid content of from 40% to 60% by weight.

DETAILED DESCRIPTION OF THE INVENTION

The following examples illustrate the invention with appropriate comparisons. In all cases, the following procedures were used:

For the gas hardening process, material mixtures in amounts of 30 kg were produced, which each consisted of 100 parts (by weight) quartz sand H 32
1 part (by weight) resin solution
1 part (by weight) 85% solution of polyisocyanate in aromatics boiling from 150°-250° C.

Only the resin solution was varied, in consideration of the type of solvent and of the type of resin. Several solvents falling in the range specified by the invention were used, as well as two familiar solvents; and as regards the resins, two different condensation resins based on phenol-formaldehyde were used, of which the first (resin A) reacted somewhat more slowly than the other (resin B). In all cases the relative humidity was from 70% to 80% and the temperature of the mixture was 24° C.±1.

The material mixtures produced in this way were made into mold shapes and hardened by treatment with gaseous triethylamine for one second. Finally, they were rinsed with air for ten seconds.

The following table summarizes bending strength of the molds thus produced for the two different resin types A and B and for a series of solvents, some of which are familiar and others new, with regard to the time of storage of the hardened molds. The same series of experiments was carried out with a material mixture that was used immediately and with one that had been stored for an hour; and with a resin treated with a silane in comparison to a resin that had not been so treated. In every case, the superiority of the solvents specified by the invention is clearly recognizable.

TABLE

Bending Strength in N/cm²

Resin Solution I : 55% resin A (not treated with silane)
14% polar solvent
30% high boiling aromatics

| polar solvent with 15% | Mixture used immediately | | | | | Mixture Stored 60 minutes | | | | |
|---|---|---|---|---|---|---|---|---|---|---|
| | Immed. | 45 min. | 24 hr. | 48 hr. | 7 days | Immed. | 45 min. | 24 hr. | 48 hr. | 7 days |
| Iso | 196 | 432 | 226 | 186 | 147 | 177 | 363 | 245 | 177 | 137 |
| DOP | 265 | 451 | 422 | 412 | 334 | 245 | 383 | 383 | 363 | 324 |
| TTM | 265 | 559 | 589 | 628 | 634 | 226 | 491 | 579 | 608 | 589 |
| DOA | 275 | 441 | 510 | 530 | 500 | 255 | 481 | 510 | 500 | 491 |
| DIDA | 275 | 481 | 500 | 520 | 540 | 265 | 461 | 491 | 491 | 520 |
| DHAZ | 284 | 491 | 530 | 530 | 530 | 255 | 461 | 530 | 520 | 530 |

Resin Solution II : 55% resin B (not treated with silane)
10% polar solvent
35% high boiling aromatics

| polar solvent with 10% | Mixture used immediately | | | | | Mixture Stored 60 minutes | | | | |
|---|---|---|---|---|---|---|---|---|---|---|
| | Immed. | 45 min. | 24 hr. | 48 hr. | 7 days | Immed. | 45 min. | 24 hr. | 48 hr. | 7 days |
| Iso | 314 | 451 | 441 | 422 | 304 | 275 | 412 | 373 | 353 | 275 |
| DOP | 216 | 481 | 520 | 540 | 520 | 206 | 422 | 432 | 451 | 451 |
| TTM | 314 | 540 | 634 | 618 | 589 | 284 | 481 | 530 | 540 | 549 |
| DOA | 314 | 530 | 559 | 608 | 608 | 284 | 451 | 510 | 549 | 549 |
| DIDA | 294 | 520 | 579 | 628 | 618 | 275 | 500 | 540 | 579 | 579 |
| DHAZ | 245 | 540 | 634 | 667 | 657 | 235 | 510 | 579 | 598 | 589 |

Resin Solution III : 55% resin A (with 0.3% silane added)
15% polar solvent
30% high boiling aromatics

| polar solvent with 15% | Mixture used immediately | | | | | Mixture Stored 60 minutes | | | | |
|---|---|---|---|---|---|---|---|---|---|---|
| | Immed. | 45 min. | 24 hr. | 48 hr. | 7 days | Immed. | 45 min. | 24 hr. | 48 hr. | 7 days |
| Iso | 206 | 412 | 392 | 363 | 314 | 216 | 402 | 373 | 353 | 324 |
| DOP | 265 | 510 | 579 | 598 | 589 | 275 | 491 | 549 | 540 | 549 |
| DOA | 294 | 549 | 628 | 647 | 706 | 275 | 510 | 579 | 569 | 618 |
| DHAZ | 265 | 530 | 634 | 697 | 736 | 255 | 510 | 589 | 634 | 677 |

Key to Abbreviations:
Iso:Isophoron
DOP:Di-(2-ethylhexyl)-phthalate
TTM:Tri-nC$_8$—C$_{10}$-Trimellitate
DOA:Di-(2-ethylhexyl)-adipate
DIDA:Di-isodecyladipate
DHAZ:Di-hexylazelainate

What is claimed is:

1. A composition useful for producing casting molds comprising about 100 parts of a flowable, granular solid, about two parts of a mixture including polyisocyanate and a polyol in proportions to form polyurethane upon reaction and an ester solvent, said solvent constituting from 40–60% of the resultant mixture, said ester having an acid component selected from the group consisting of an aliphatic dicarboxylic acid having from six to twelve carbon atoms and a benzene polycarboxylic acid having at least three COOH groups and an alcohol component having from six to thirteen carbon atoms and selected from aliphatic alcohol, cycloaliphatic alcohol, arylaliphatic alcohol, and aromatic alcohol.

2. The composition of claim 1 including a nonpolar solvent.

3. The composition of claim 2 wherein said nonpolar solvent constitutes from 40% to 90% by weight of the total solvent.